United States Patent
Smutny et al.

(10) Patent No.: US 7,594,629 B2
(45) Date of Patent: Sep. 29, 2009

(54) CLIP FOR FASTENING AN ARTICLE TO A PANEL

(75) Inventors: Dale J. Smutny, Canfield, OH (US); Laura M. Lewis, North Jackson, OH (US)

(73) Assignee: Delphi Technologies, Inc., Troy, MI (US)

( * ) Notice: Subject to any disclaimer, the term of this patent is extended or adjusted under 35 U.S.C. 154(b) by 429 days.

(21) Appl. No.: 11/450,647

(22) Filed: Jun. 9, 2006

(65) Prior Publication Data

US 2007/0284486 A1 Dec. 13, 2007

(51) Int. Cl.
*F16L 3/00* (2006.01)

(52) U.S. Cl. .......................... 248/71; 248/74.3

(58) Field of Classification Search ............... 248/71, 248/74.1, 74.2, 74.3; 24/16 PB
See application file for complete search history.

(56) References Cited

U.S. PATENT DOCUMENTS

| | | | |
|---|---|---|---|
| 5,012,995 A | 5/1991 | Ward et al. | |
| D347,782 S * | 6/1994 | Wentzel | D8/356 |
| 5,362,018 A | 11/1994 | Darr et al. | |
| 5,716,161 A * | 2/1998 | Moore et al. | 403/326 |
| 6,203,240 B1 * | 3/2001 | Hironaka et al. | 403/397 |
| 6,749,157 B2 * | 6/2004 | Takeuchi | 248/71 |
| 7,019,215 B2 * | 3/2006 | Arai | 174/72 A |
| 7,152,281 B2 * | 12/2006 | Scroggie | 24/297 |
| 7,201,352 B2 * | 4/2007 | Kawai | 248/74.1 |
| 7,316,375 B2 * | 1/2008 | Wakabayashi et al. | 248/71 |
| 7,322,548 B2 * | 1/2008 | Mielke et al. | 248/74.3 |
| 7,337,505 B1 * | 3/2008 | Scroggie et al. | 24/297 |
| 2003/0159256 A1 * | 8/2003 | Clarke | 24/297 |

* cited by examiner

*Primary Examiner*—J. Allen Shriver
*Assistant Examiner*—Steven Marsh
(74) *Attorney, Agent, or Firm*—Thomas N. Twomey

(57) ABSTRACT

A clip for fastening an article to a panel having a hole has a base and a self expanding head extending upwardly from the base. The self-expanding head has at least one column rising from the base to a platform that is spaced from the base. First and second pluralities of resilient legs attached to the platform extend toward the base. The first plurality of resilient legs have first retention shoulders that are spaced from the base and the second plurality of resilient legs have second and third retention shoulders that are spaced from the base. The second and third retention shoulders are located respectively closer to the base than the first retention shoulders so that the clip can be attached to panels of varying thickness when the head is inserted through a hole in the panel with the base abutting one side of the panel adjacent the hole and the first retention shoulders or the second retention shoulders or the third retention shoulders abutting an opposite side of the panel adjacent the hole.

14 Claims, 1 Drawing Sheet

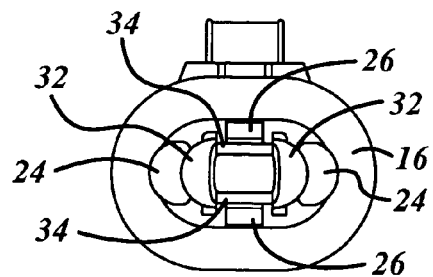
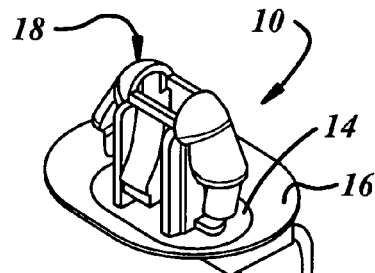
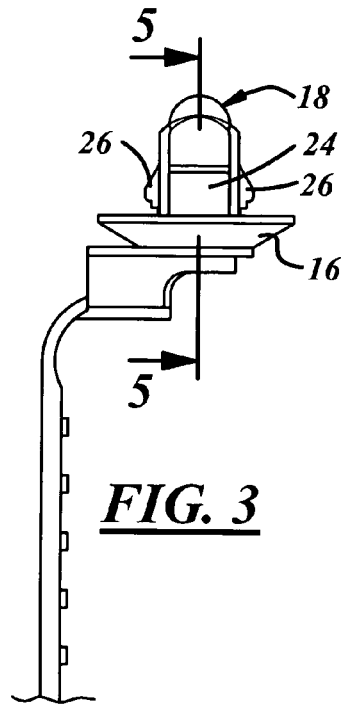
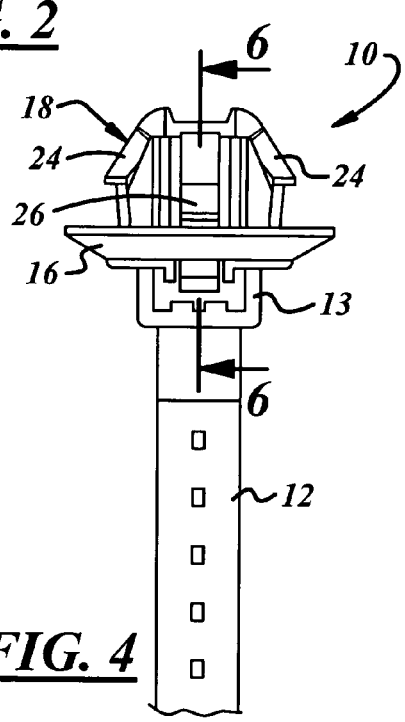
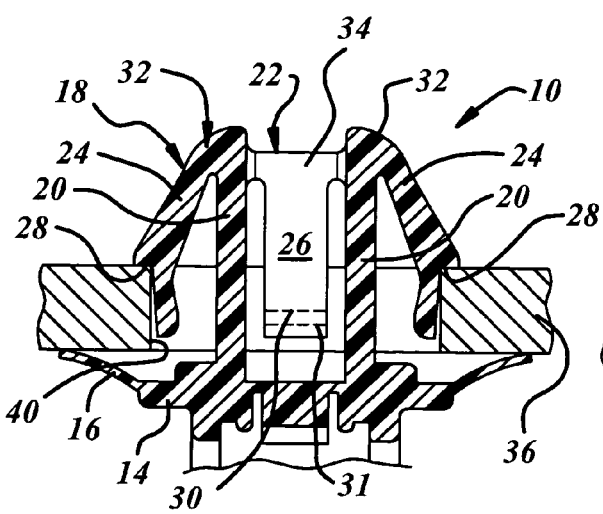
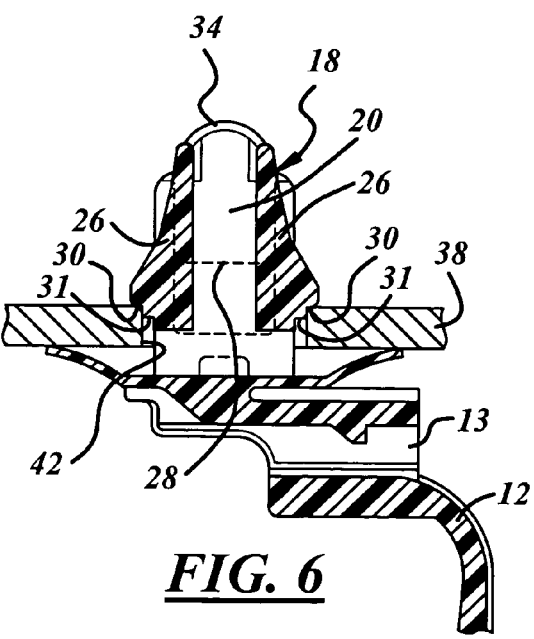
FIG. 1
FIG. 2
FIG. 3
FIG. 4
FIG. 5
FIG. 6

CLIP FOR FASTENING AN ARTICLE TO A PANEL

BACKGROUND OF THE INVENTION

This invention relates generally to a clip for fastening an article to a panel having a hole.

U.S. Pat. No. 5,012,995 granted to Robert W. Ward et al May 7, 1991 discloses an adjustable clip that fastens an article, in this case a wiring harness, to a panel having a hole. The adjustable clip has a typical arrangement for attaching the clip to the panel using the hole that extends through the panel. This typical arrangement includes a rigid base and a self-expanding head that is attached to the base and that is insertable into the hole of the panel. The self-expanding head has a plurality of resilient, bowed legs with outer retention shoulders midway along their length. The resilient, bowed legs are collapsed as the self expanding head is pushed into the hole. When the outer retention shoulders pass through the hole, the resilient bowed legs expand outwardly and engage the back side of the panel trapping the panel between the retention shoulders of the resilient legs and the rigid base of the clip.

U.S. Pat. No. 5,362,018 granted to Christopher J. Darr et al discloses a reversible clip that also fastens an article, such as a wiring harness to a panel having a hole. The reversible clip has another typical arrangement for attaching the clip to the panel using the hole that extends through the panel. This typical arrangement also includes a rigid base and a self-expanding head that is attached to the base and that is insertable into the hole of the panel. The self-expanding head has a plurality of resilient legs that slant outwardly toward the rigid base. The end portions of the resilient legs are collapsed inwardly as the self expanding head is pushed into the hole. When the collapsed end portions pass through the hole, the end portions of the resilient legs expand outwardly and the ends of the legs engage the back side of the panel trapping the panel between the ends of the legs and the rigid base of the clip.

Clips with typical arrangements of a base and a self-expanding head of the types described in the '995 and '018 patents have been used successfully for many years. However, clips with these typical types of arrangement are limited for use with panels within a small range of thicknesses. For instance, as a practical matter, a typical design using the arrangement shown in the '995 patent can be used with a panel having a thickness in a small range of panel thicknesses, for example a range of about 1 mm to about 3 mm. This limitation results in the necessity for tooling several different size clips for accommodating a large range of panel thicknesses. This is costly not only for manufacture but also for carrying a large inventory.

SUMMARY OF THE INVENTION

This invention provides a clip that can be attached to panels within a wide range of thicknesses thereby reducing the number of clip sizes, manufacturing cost and inventory requirements. By way of example and not by limitation as to the scope of the claims, a typical clip of the invention can for instance be used with panels having a thickness within a range of about 0.6 mm to about 5 mm.

The clip in accordance with the invention has a base, a self-expanding head having at least one column rising from the base, and two sets of a plurality of resilient legs with the first set of legs having first retention shoulders that are located farther from the base than the second retention shoulders or third retention shoulders located on the second set of legs, and the third retention shoulders are located closer to the base than second retention shoulders with the third retention shoulders being located inbound from the second retention shoulders, and the first retention shoulders on the first set of legs fasten the clip securely to thicker panels while the second retention shoulders and the third retention shoulders on the second set of legs fasten the clip securely to thinner panels. Consequently, the clip of the invention can be used with panels within a range of thicknesses that is at least double the range possible with the prior art clips.

The clip of the invention preferably has a resilient lip attached to the base for engaging the insertion side of the panel to increase the range of panel thickness that can be accommodated by the clip.

BRIEF DESCRIPTION OF THE DRAWINGS

FIG. 1 is a perspective view of a clip of the invention;
FIG. 2 is a top view of the clip shown in FIG. 1;
FIG. 3 is a side view of the clip shown in FIG. 1;
FIG. 4 is front view of the clip shown in FIG. 1;
FIG. 5 is a section view taken substantially along the line 5-5 of FIG. 3 looking in the direction of the arrows and showing the clip attached to a thicker panel; and
FIG. 6 is a section view taken substantially along the line 6-6 of FIG. 4 looking in the direction of the arrows and showing the clip attached to a thinner panel.

DETAILED DESCRIPTION OF THE PREFERRED EMBODIMENTS

Referring now to the drawing a clip 10 for attaching an article, such as a wiring harness (not shown) to a support panel is illustrated. To this end clip 10 includes a strap 12 that is wrapped around a wiring harness (not shown) and secured in a buckle 13 in a well known manner. However, it is to be understood that the strap 12, per se does not form a part of the invention because the clip 10 of the invention can be adapted to attach practically any article to a support panel, with a wiring harness merely being one of several possibilities.

Clip 10 comprises a base 14. A resilient lip 16 is attached base 14 so that it extends upwardly and outwardly from base 14. The resilient lip 16 is preferably a resilient dish with a continuous planar edge as shown. Clip 10 further includes a self expanding head 18 that is attached to base 14 so that the self expanding head 18 extending upwardly from the base past the resilient lip 16.

Self-expanding head 18 has a pair of columns 20 rising from base 14 to a platform 22 that is spaced from base 14 to support at least two sets of resilient legs with resilient legs in each set being different. One set supported by platform 22 is a first pair of resilient legs 24 that are attached to platform 22 so as to extend toward base 14 in cantilever fashion and the other set is also a pair of resilient legs 26 that are attached to platform 22 so as to extend toward base 14 in cantilever fashion. The first pair of resilient legs 24 have first retention shoulders 28 and the second pair of resilient legs 26 have second and third retention shoulders 30 and 31. The first, second and third retention shoulders 28, 30 and 31 are all spaced from the resilient lip 16.

The first pair of resilient legs 24 are preferably longer than the second pair of resilient legs 26 with the second and third retention shoulders 30 and 31 being located closer to the resilient lip 16 than the first retention shoulders 28. The different respective locations of the first, second and third retention shoulders 28, 30 and 31 are enable clip 10 to be attached to panels within a wide range of thickness. When the self-expanding head 18 is inserted through a hole in the panel the resilient lip 16 engages one side of the panel adjacent the hole and either the first retention shoulders 28 or the second retention shoulders 30 or the third retention shoulders 31 engage an opposite side of the panel adjacent the hole depending on the thickness of the panel.

Platform 22 is preferably annular having end portions 32 at the ends of columns 20 and bridge portions 34 that span columns 20. The first pair of resilient legs 24 are attached to the end portions 32 of the columns 20 and are aligned with the columns. The second pair of resilient legs 26 are attached to the bridge portions 34 that span the columns 20 and are aligned with spaces between columns 20 so that the resilient legs 26 can deflect inwardly of columns 20. This is an advantage when the base 14 is an oval as shown in the drawings, and the resilient legs 26 are arranged on the minor diameter because this permits a larger width for the legs 26 which in turn provides greater retention and allows for easier part molding.

The retention shoulders 28, 30 and 31 are preferably outer retention shoulders that are spaced from the lower ends of their respective resilient legs 24 and 26 so that the lower portions of the legs are disposed in the hole of the panel to which the clip 10 is attached. These lower leg portions limit the spread of the resilient legs 24 and 26 as explained below in connection with FIGS. 5 and 6 which show clip 10 attached to thicker and thinner panels 36 and 38 respectively, each of which has an oval hole.

FIG. 5 shows clip 10 attached to thicker panel 36. In this instance, when the self-expanding head 18 is inserted into the hole 40 of the thicker panel, the portion of the panel adjacent hole 40 is trapped between the resilient lip 16 abutting the front or insertion side of panel 36 and the retention shoulders 28 abutting the back side of the panel.

FIG. 6 shows clip 10 attached to thinner panel 38. In this instance, when the self-expanding head 18 is inserted into the hole 42 of the thinner panel, the portion of the panel adjacent hole 40 is trapped between the resilient lip 16 abutting the front or insertion side of panel 38 and the retention shoulders 30 abutting the back side of the panel. While the retention shoulders 30 enable clip 10 to be attached to panels within a wide range of thickness, clip 10 can be further enhanced by the third retention shoulders 31 which extend the range of use still further so that clip 10 can be attached to an even thinner panel (not shown). Each of the resilient legs 24 and 30 extends beyond its respective outer retention shoulder 28 or 30 so that the lower portion of the leg enters the hole and prevents the pair of trapping legs from spreading too far apart. In each instance, the lower portions of other non-trapping pair of legs is also preferably disposed in the hole to prevent snagging loose ends of the non-trapping legs. Another advantage in this regard is that shoulders 28 for retaining thicker panel 36 act as a back-up retention of thinner panel 38 resisting pull out of self-expanding head 18 when clip 10 is attached to thinner panel 38.

The clip of the invention has been explained in connection with a self expanding head having two sets of resilient legs with each set being a pair of resilient legs. This example is the minimum number of four resilient legs divided into two sets. However, the self-expanding head may have more than two sets of resilient legs and each set may include more than a pair of resilient legs. Moreover, the example shows one set of resilient legs with one retention shoulder and one set of resilient legs with two retention shoulders. However, each set of resilient legs may have one or more retention shoulders.

In other words, it will be readily understood by those persons skilled in the art that the present invention is susceptible of broad utility and application. Many embodiments and adaptations of the present invention other than those described above, as well as many variations, modifications and equivalent arrangements, will be apparent from or reasonably suggested by the present invention and the foregoing description, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the following claims and the equivalents thereof.

We claim:

1. A clip for fastening an article to a panel having a hole, the clip comprising:
   a base,
   a self-expanding head attached to the base and extending upwardly from the base,
   the self-expanding head having at least one column rising from the base to a platform that is spaced from the base,
   a first plurality of resilient legs attached to the platform and extending toward the base, the first plurality of resilient legs having first retention shoulders spaced from the base, and
   a second plurality of resilient legs attached to the platform and extending toward the base and the second plurality of resilient legs having second retention shoulders and third retention shoulders that are spaced from the base, and the second retention shoulders being located closer to the base than the first retention shoulders and the third retention shoulders being located closer to the base than the second retention shoulders and the third retention shoulders being located inboard from the second retention shoulders, so that the clip can be attached to panels of varying thickness when the head is inserted through a hole in the panel with the base abutting one side of the panel adjacent the hole and the first retention shoulders or the second retention shoulders abutting an opposite side of the panel adjacent the hole.

2. A clip for fastening an article to a panel having a hole, the clip comprising:
   a base,
   a self-expanding head attached to the base and extending upwardly from the base, the self-expanding head having two columns rising from the base and a platform having end portions at the ends of the columns and bridge portions that span the columns,
   a first plurality of resilient legs attached to the platform and extending toward the base, the first plurality of resilient legs having first retention shoulders spaced from the base, and
   a second plurality of resilient legs attached to the platform and extending toward the base, the second plurality of resilient legs having second retention shoulders that are spaced from the base, and the second retention shoulders being located closer to the base than the first retention shoulders so that the clip can be attached to panels of varying thickness when the head is inserted through a hole in the panel with the base abutting one side of the panel adjacent the hole and the first retention shoulders or the second retention shoulders abutting an opposite side of the panel adjacent the hole.

3. The clip as defined in claim 2 wherein the base is an oval having a major diameter and a minor diameter.

4. The clip as defined in claim 3 wherein the columns are spaced from each other in a direction of the major diameter of the oval and wherein the first plurality of resilient legs is attached to the end portions of the platform and the second plurality of resilient legs is attached to the bridge portions of the platform.

5. The clip as defined in claim 4 wherein the columns are spaced from each other in the direction of the major diameter and the second plurality of resilient legs are aligned with spaces between the columns.

6. The clip as defined in claim 5 wherein the base of the clip includes a resilient lip that slants upwardly and outwardly from the base.

7. The clip as defined in claim 2 wherein the second plurality of resilient legs has third retention shoulders.

8. The clip as defined in claim 7 wherein the third retention shoulders are located closer to the base than the second retention shoulders.

9. A clip for fastening an article to a panel having a hole, the clip comprising:
   a base,
   a resilient dish attached to the base, the resilient dish extending upwardly and outwardly from the base,
   a self-expanding head attached to the base and extending upwardly from the base past the resilient dish, the self-expanding head having a pair of columns rising from the base to a platform that is spaced from the base,
   a first pair of resilient legs attached to the platform and extending toward the base in cantilever fashion, the first pair of resilient legs having first retention shoulders spaced from the resilient dish,
   a second pair of resilient legs attached to the platform end extending toward the base in cantilever fashion, the second pair of resilient legs having second retention shoulders that are spaced from the resilient dish, and the second retention shoulders being located closer to the resilient dish than the first retention shoulders so that the clip can be attached to panels of varying thickness when the head is inserted through a hole in the panel with the resilient dish abutting one side of the panel adjacent the hole and the first retention shoulders or the second retention shoulders abutting an opposite side of the panel adjacent the hole.

10. The clip as defined in claim 9 wherein the platform is annular having end portions at the ends of the columns and bridge portions that span the columns.

11. The clip as defined in claim 10 wherein the base is an oval having a major diameter and a minor diameter.

12. The clip as defined in claim 11 wherein the columns are parallel and spaced from each other in a direction of the major diameter of the oval and wherein the first retention shoulders are spaced from each other in the direction of the major diameter.

13. The clip as defined in claim 12 wherein the first pair of legs are aligned with the columns and the second pair of legs are aligned with spaces between the columns.

14. The clip as defined in claim 13 wherein the retention shoulders are outer retention shoulders and the first pair of resilient legs and the second pair of resilient legs have lower portions below the outer retention shoulders for limiting the spread of the first and second pairs of resilient legs when the clip is attached to a panel having a hole.

* * * * *